United States Patent
Childress et al.

(10) Patent No.: US 10,348,850 B2
(45) Date of Patent: *Jul. 9, 2019

(54) SMART CACHE FOR OFFLINE DATA AVAILABILITY

(71) Applicant: International Business Machines Corporation, Armonk, NY (US)

(72) Inventors: Rhonda L. Childress, Austin, TX (US); Kim A. Eckert, Austin, TX (US); Ryan D. McNair, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/895,527

(22) Filed: Feb. 13, 2018

(65) Prior Publication Data

US 2018/0176322 A1    Jun. 21, 2018

Related U.S. Application Data

(63) Continuation of application No. 14/619,208, filed on Feb. 11, 2015, now Pat. No. 9,936,041.

(51) Int. Cl.
*G06F 15/167* (2006.01)
*H04L 29/08* (2006.01)

(52) U.S. Cl.
CPC ...... *H04L 67/2842* (2013.01); *H04L 67/2847* (2013.01); *H04L 67/2852* (2013.01)

(58) Field of Classification Search
CPC .................. H04L 67/2842; G06F 15/167
USPC .......................................................... 709/213
See application file for complete search history.

(56) References Cited

U.S. PATENT DOCUMENTS

| | | | | |
|---|---|---|---|---|
| 2003/0187935 A1* | 10/2003 | Agarwalla | .............. | H04L 29/06 709/206 |
| 2007/0136772 A1* | 6/2007 | Weaver | .............. | H04N 7/17318 725/95 |
| 2009/0221266 A1* | 9/2009 | Ohta | ...................... | G06F 21/604 455/411 |
| 2010/0235473 A1* | 9/2010 | Koren | ............... | G06F 17/30902 709/219 |
| 2013/0262439 A1* | 10/2013 | Hao | .................... | G06F 17/3064 707/722 |

OTHER PUBLICATIONS

Appendix P, 2018.

* cited by examiner

*Primary Examiner* — Tauqir Hussain
(74) *Attorney, Agent, or Firm* — Garg Law Firm, PLLC; Rakesh Garg; Christopher K. McLane

(57) ABSTRACT

At an application executing in a system, a usage pattern of the system and an entry in a data use history of the system are analyzed. Responsive to the analyzing, a data item is identified for caching at the system, wherein the data item is accessible to the system from at a remote data processing system over a data network at a present time, and the data item will be requested from the system at a future time when no network connectivity will be available to the system. A determination is made whether a caching control prevents the caching of the data item at the system. Responsive to the caching control not preventing the caching of the data item, the data item is cached on the system.

19 Claims, 7 Drawing Sheets

US 10,348,850 B2

SMART CACHE FOR OFFLINE DATA AVAILABILITY

TECHNICAL FIELD

The present invention relates generally to a method, system, and computer program product for accessing data when network connectivity is available. More particularly, the present invention relates to a method, system, and computer program product for smart cache for offline data availability.

BACKGROUND

Users are increasingly dependent upon remote data that is accessible over a data network. Users assume that the network connectivity will be available as and when they need to access data over a data network. Sometimes, users do not even realize that the data they are accessing or using has to be, or has been retrieved over a data network.

Network connectivity is not always available. In some cases, the network infrastructure is not present in a location where network connectivity is desired. In some other cases, the network infrastructure is not functional at a time or place where the connectivity is desired. In some other cases, the network infrastructure prevents the use of the network at a time, from a place, or by a user when the connectivity is needed.

Data storage technology already exists to store data locally on a data processing system or device such that the data can be accessed without needing network connectivity. Presently, a user can cache a website for offline browsing. Similarly, presently, a user can download files from file servers for use when the file-server is not accessible over a network. Presently, an application can buffer the music that is presently playing on a portable device for uninterrupted playback when network signal is intermittently lost on a portable device during the playback.

SUMMARY

The illustrative embodiments provide a method, system, and computer program product for smart cache for offline data availability. An embodiment includes a method for automatically caching remote data for offline availability. The embodiment analyzes, at an application executing in a first data processing system, a usage pattern of the first data processing system and an entry in a data use history of the first data processing system. The embodiment identifies, responsive to the analyzing, a data item for caching at the first data processing system, wherein the data item is accessible to the first data processing system from at a remote data processing system over a data network at a present time, and the data item will be requested from the first data processing system at a future time when no network connectivity will be available to the first data processing system. The embodiment determines whether a caching control prevents the caching of the data item at the first data processing system. The embodiment caches, responsive to the caching control not preventing the caching of the data item, the data item on the first data processing system.

Another embodiment includes a computer program product for automatically caching remote data for offline availability.

Another embodiment includes a computer system for automatically caching remote data for offline availability.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
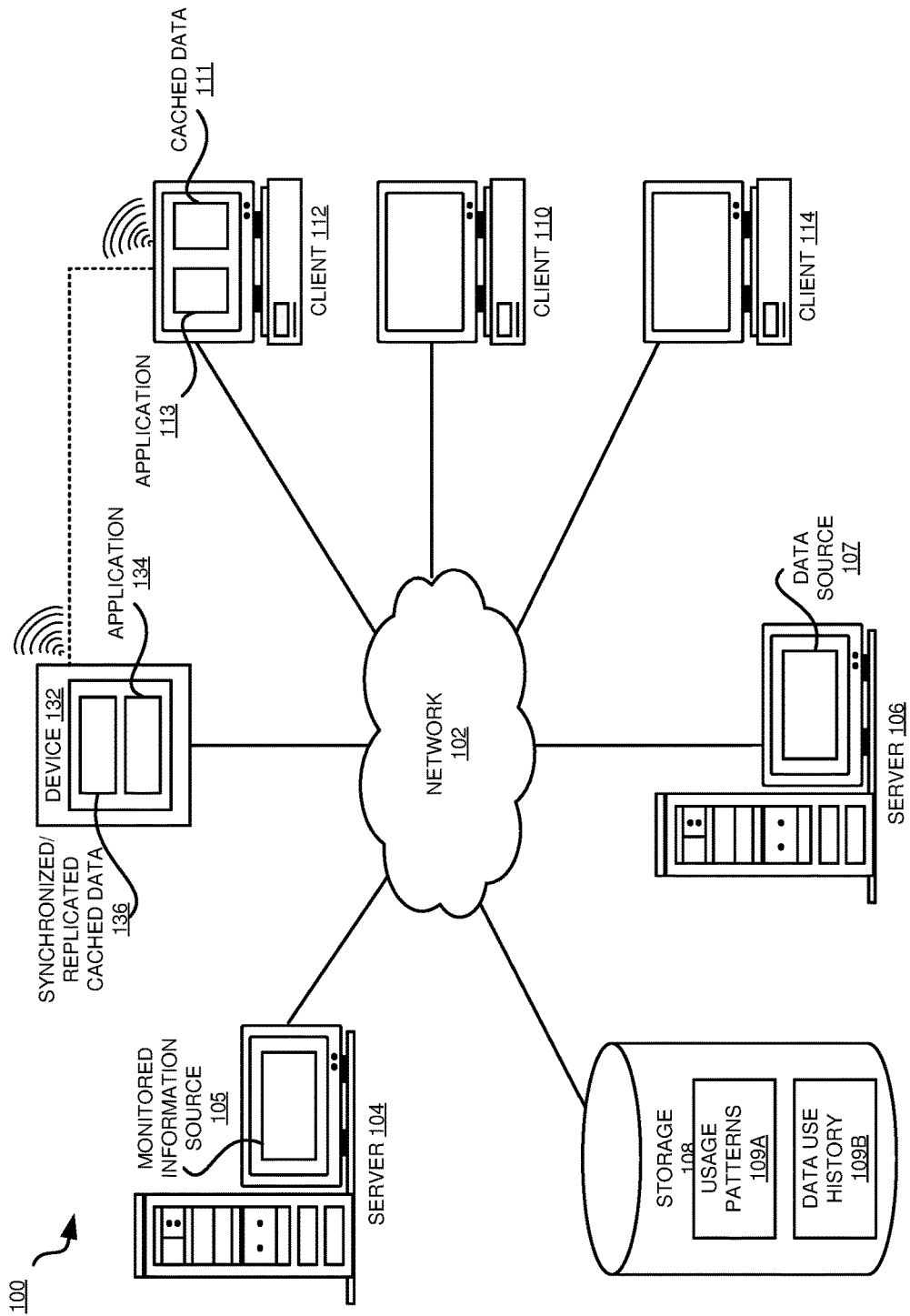
FIG. 1 depicts a block diagram of a network of data processing systems in which illustrative embodiments may be implemented.

A data processing system or a device is said to be offline when network connectivity is unavailable or unusable to access data that is stored remotely from the data processing system or device. The process of making data, which is stored remotely from a user's data processing system and is accessed over a data network, available on the user's data processing system so that accessing the data at a time and place when the data processing system is offline is referred to herein as "caching". Generally, to accomplish the caching on a user's local data processing system, the remote data can be downloaded, copied, accessed, captured, mirrored, or retrieved from a remote data storage onto the local data processing system of the user.

Depending on the context in which the term "cache" is used, cache refers to either the act of caching, a local collection of such remote data, or a storage device used to store the collection. Any suitable storage device coupled with the data processing system is usable to cache data for offline use at the data processing system.

The illustrative embodiments recognize that presently available solutions for caching remote data locally on a data processing system for offline use are highly user-dependent. For example, presently, a user has to decide what website or portions thereof to download, which files to copy from a file server, which music to store locally, so that such data will be available when the user knows the user is likely to be offline.

Even when an application caches some data, such as a music player application buffering a portion of the presently playing music, the application does so in only for the user-selected music or other data that the user is using at the time of the caching. The automatic caching presently available is limited to caching the data that is currently in use at the time of the caching, such as when a user is editing a remote file or listing to a streaming music.

For example, the automatic caching available today cannot cache a file while the user is using a different file, or cache a different track than the track the user is playing. Even if a different file or data is automatically cached, the different file has to be related to the present file or data. For example, if a user is viewing a page in the browser, data in other files that are related to that page is cached. If a user is playing one track, the next track is the user's playlist is cached. In other words, presently, either the user has to specify the data that should be caches, or the user has to be using the data at the time for the data to be cached, or the user or the data itself has to specify a relationship between the presently used data and the data to be cached.

The illustrative embodiments recognize that a presently available caching solution cannot anticipate which data the user is likely to need at a future time when the user will not have access to a data network. The illustrative embodiments further recognize that a presently available caching solution cannot anticipate the future period when the user will not have access to a data network, and what data the user will likely need at that future time. Furthermore, a presently available caching solution cannot anticipate which of the several devices or data processing systems the user will be using at a future time when the user will not have access to a data network, so that the data the user will likely need at that future time can be cached or synchronized on the device that will likely be used then.

The illustrative embodiments used to describe the invention generally address and solve the above-described problems and other problems related to automatically caching data for future offline use. The illustrative embodiments provide a method, system, and computer program product for smart cache for offline data availability.

An embodiment monitors a user's usage patterns. A usage pattern within the scope of the illustrative embodiments comprises temporal information about when the user uses certain data or certain types of data, when the user had network connectivity or is offline, when certain devices associated with the user are used by the user, or some combination thereof.

A user can have any number of usage patterns. For example, the user may have one or more usage patterns while at home and other one or more usage patterns while at work. As another example, the user may have one or more usage patterns while in one office location and other one or more usage patterns while in another office location. As another example, the user may have one or more usage patterns on weekdays and other one or more usage patterns on weekends. As another example, the user may have one or more usage patterns before noon on weekdays and other one or more usage patterns in the afternoons during the weekdays.

Generally, the user may have different usage patterns based on different days, time periods, locations, or other circumstances. An example usage pattern may include information that the user is present within a geographical boundary G1, using device D1, with a network being available. Another example usage pattern may include information that the user travels from location L1 to location L2, using device D2, while offline. An example usage pattern may include information that the user travels within a geographical area G2, using devices D1 and D3, with a network being sporadically available. These examples of usage patterns and manners of forming them are not intended to be limiting on the illustrative embodiments. From this disclosure, those of ordinary skill in the art will be able to conceive many other usage patterns and manners of forming usage patterns, and the same are contemplated within the scope of the illustrative embodiments.

An embodiment monitors a user's data use history. Within the scope of the illustrative embodiments, an entry in a user's data use history comprises information about the data or type of data used by the user in a usage pattern.

A user can have any number of entries in the user's data use history. For example, the user may have one or more data use history entries for a usage pattern while at home and other one or more data use history entries for a usage pattern while at work. As another example, the user may have one or more data use history entries for a usage pattern while at one location in the office and other one or more data use history entries for a usage pattern while at another location in the office. As another example, the user may have one or more data use history entries for a usage pattern during weekdays and other one or more data use history entries for a usage pattern during weekends. As another example, the user may have one or more data use history entries for a usage pattern before noon on weekdays and other one or more data use history entries for a usage pattern after noon on weekdays.

Generally, the user may have different data use history entries based on different days, time periods, locations, or other circumstances. An example data use history entry may include information that the user uses websites W1 and W2 in usage pattern U1. Another example data use history entry may include information that the user works in directories D1-D8 of file-system F1 in usage pattern U2. Another example data use history entry may include information that the user edits journal J1 while listening to music of genre G1 in usage pattern U3. These examples of data use history entries and manners of forming them are not intended to be limiting on the illustrative embodiments. From this disclosure, those of ordinary skill in the art will be able to conceive many other data use history entries and manners of forming usage patterns, and the same are contemplated within the scope of the illustrative embodiments.

An embodiment analyzes the usage patterns and data use history entries. From this analysis the embodiment identifies the data that the user is likely to need at a future time when a usage pattern indicates that the user will likely be offline.

Subject to caching controls, an embodiment caches the identified data on at least one of the user's devices or data processing system. A caching control is a method, information, logic, configuration, or a combination thereof, that is applicable to a particular data item and usable to determine whether the data item can be cached.

As one example of a caching control, a corporate policy may prevent caching of certain data items from the corporate file-system, and such data items may therefore not be cached. As another example of a caching control, a server may always, or at certain times, prevent caching of certain data items from the server, and such data items may therefore not be cached at those times. As one example of a caching control, a data item may allow, conditionally allow, or prevent caching of itself. As one example of a caching control, a device or data processing system may allow, conditionally allow, or prevent caching of all or some data items on that device or data processing system.

If a data item can be cached, a caching control is also usable to determine a condition under which the data item may be cached. For example, one example caching control may allow caching of a data item only if the device on which the data item is cached remains within a defined geographical perimeter. Another example caching control may allow caching of a data item only for a defined period from the time of caching. Another example caching control may allow caching of a data item only if the device on which the data item is cached is used by a particular user identifier.

A caching control can also un-cache a cached data item. Un-aching a data item is the process of removing from the data item cache. For example, a caching control may un-cache a data item after a defined period from the time of caching. Another example caching control may un-cache a data item if the device on which the data item is cached leaves a geographical perimeter. Another example caching control may un-cache a data item if a different user identifier is used on the device on which the data item is cached. Another example caching control may un-cache a data item if the device connects to a particular network or loads a particular software.

These examples of caching controls are not intended to be limiting. From this disclosure, those of ordinary skill in the art will be able to conceive many other caching controls and the same are contemplated within the scope of the illustrative embodiments.

Furthermore, a usage pattern and a data use history entry may be forward-looking. For example, regardless of what the user's usage patterns at 5 PM on weekdays have been, a calendar entry in the user's calendar or an item on the user's to-do list may show that on a particular weekday two weeks from now, the user is scheduled to visit a museum at 5 PM. Museum visits may or may not be on the user's usage patterns. Accordingly, an embodiment determines that information related to the museum will be useful to the user at 5 PM on that weekday while at the museum. Using network availability information from other sources, an embodiment determines that the network connectivity at the museum is expected to be poor or unavailable.

For example, one embodiment searches social media entries to collect information about other users' network connectivity experience at the museum to make this determination. As another example, another embodiment searches the internet using a search engine to collect network connectivity information about the museum to make this determination. As another example, another embodiment looks up a repository of network connectivity information to locate network connectivity information about the museum to make this determination. These examples of determining the network connectivity information at a location are not intended to be limiting. From this disclosure, those of ordinary skill in the art will be able to conceive many other ways to determine network connectivity information at a location, and the same are contemplated within the scope of the illustrative embodiments.

An embodiment caches museum related information, information about exhibits expected at the museum at 5 PM on that weekday two weeks from now, and similarly purposed information. Thus, even though the user may not have visited the museum before, may not have visited the museums website before, may not have looked up the exhibit information before, and the like, the user will have that information in the cache of a user's device when the user is present and offline at the museum at 5 PM on that weekday.

A manifest of a cache is a listing of those data items that exist in a cache, should be cached, or a combination thereof. For example, to prepare for the 5 PM weekday usage pattern for the day of the museum visit, an embodiment caches some files from the office file-server, and some museum-related data from a website. A manifest of such a cache includes the listing of all the office files and the website files, and optionally their organization.

Assume that an embodiment cached these data items one hour before the user leaves the office for the museum. The data items are cached from their respective sources using the network connectivity at the office, and onto an office laptop where the embodiment is executing.

The embodiment further determines, from a usage pattern, that the user will likely not carry the laptop when the user has an excursion planned during a usage pattern. One or more usage patterns inform the embodiment that the user carries his tablet computer on such excursions.

Accordingly, an embodiment prepares to move, copy, replicate, or otherwise synchronize (collectively referred to hereinafter as "synchronize" or "sync") the cache from the laptop to the tablet. An embodiment can perform the sync in multiple ways. Under certain circumstances, such as when the tablet cannot connect or is not connected to the data network from which the tablet can access the data directly, an embodiment synchronizes the cache by transferring data items from one device to another. Under other circumstances, such as when the tablet can connect or is connected to the data network from which the tablet can access the data directly, an embodiment passes the manifest of the cache from one device to another, and the device that receives the manifest downloads the data items from their respective sources directly for caching. Under some circumstances, an embodiment may transfer some data items and a portion of a manifest from one device to another during a sync operation.

Some caching controls can control sync operations as well. For example, a data item allowed to be cached on one device may not be allowed for caching on another device. For example, from the example manifest above, a caching control may be configured such that the office files are allowed to be cached in the laptop but not on the user's tablet.

Thus, when an embodiment determines that the user will be carrying the tablet and not the laptop when and where the user is likely to be offline, such a caching control may prohibit the transfer of the office files to the tablet, or even listing the office files in the manifest that is transferred to the tablet. Accordingly, the embodiment edits the manifest to remove those data items that cannot be cached on the target device and sends the edited manifest to the target device, which in the above example is the tablet. Similarly, when transferring data items to a target device, the embodiment removes those data items from the synchronized data items which cannot be cached on the target device.

Caching controls that apply to synchronization can take a variety of forms too. For example, one caching control determines which data items can be transferred during a sync operation to a particular device or device type. Another example caching control determines which data items can be transferred during a sync operation to a particular device or device type, while that device is in a geographical area, during a given period, for a certain user identifier, or a combination thereof. These examples of additional caching controls usable for synchronization are not intended to be limiting. From this disclosure, those of ordinary skill in the art will be able to conceive many other similarly purposed caching controls and the same are contemplated within the scope of the illustrative embodiments.

Once data items are available in cache at a data processing system, an embodiment operates to redirect the user's request for those data items to the cache. For example, when at the museum, the user tries to go to the museum's website, an embodiment redirects the user's request for the museum's webpage to the cache and delivers the cached webpage data item in response to the user's request.

A method of an embodiment described herein, when implemented to execute on a device or data processing system, comprises substantial advancement of the functionality of that device or data processing system in making remote data available offline. For example, in order to cache remote data for offline use, the prior-art requires a user to either specify the data or specify a relationship of an activity or data in present use with the data that is to be cached. In contrast, an embodiment monitors a user's usage patterns and data use history to automatically determine when the user will lose network connectivity, what data the user will need while the user is offline, and on which device or data processing system the user will expect that data at the time and place of losing the connectivity. An embodiment uses additional resources, such as information monitored and collected from other sources such as calendars, social media, search engines, and the like, to make these automatic determinations. Such manner of automatic caching, is unavailable in presently available devices or data processing systems. Thus, a substantial advancement of such devices or data processing systems by executing a method of an embodiment facilitates automatic smart cache for offline data availability.

The illustrative embodiments are described with respect to certain data items, usage patterns, data use history entries, networks, times, places, conditions, controls, manifests, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
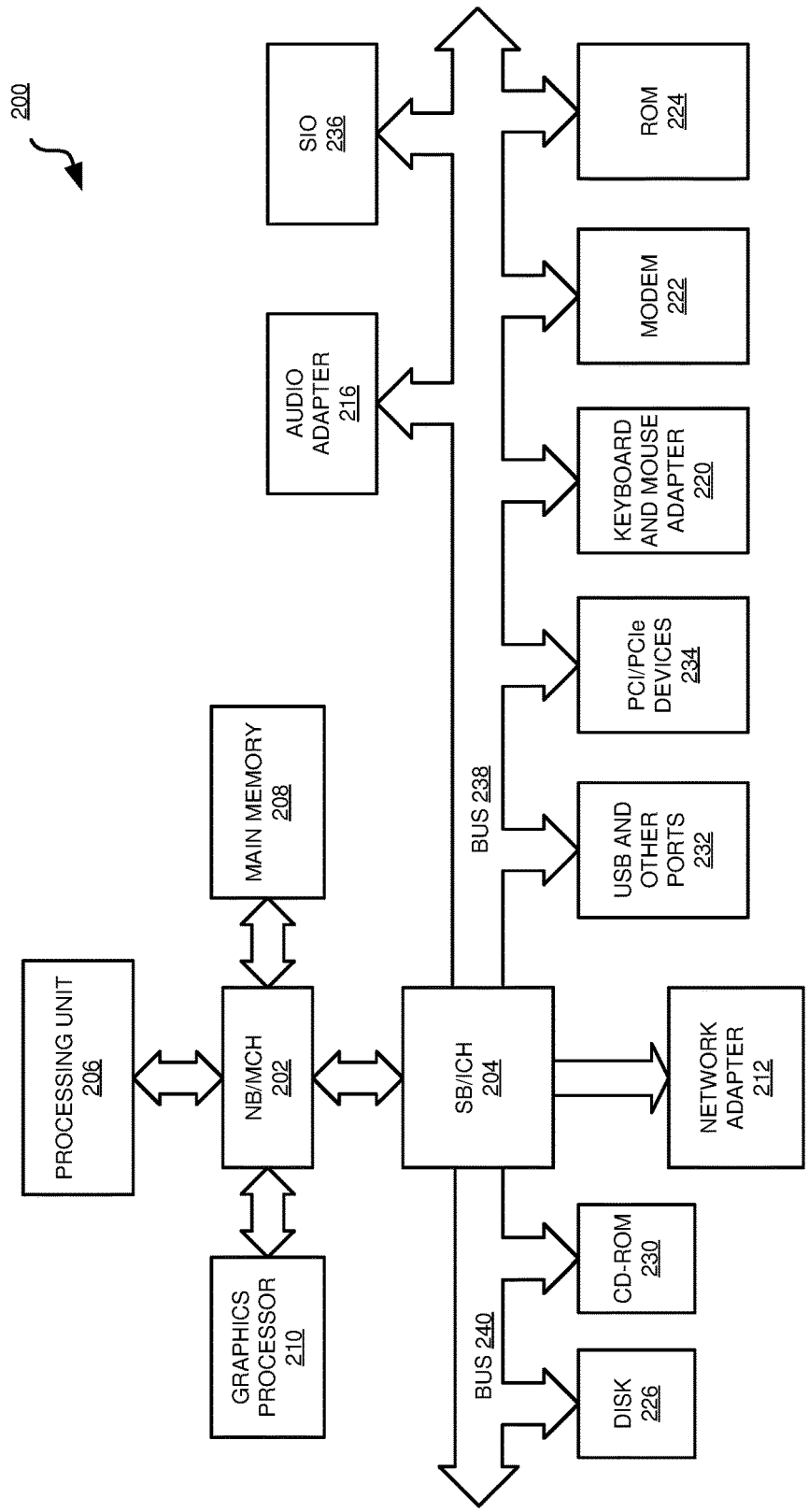
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner. Application 113 implements an embodiment described herein. Cached data 111 comprises data items that have been cached on client 112 from, for example, data source 107 over network 102. Application 113 uses usage patterns 109A and data use history 109B to determine the data items to cache in cache 111. Monitored information source 105 can be any suitable additional source, such as a source of calendaring data, social media server, or a search engine, which provides information to a monitoring component of application 113, for use in identifying the items that should be in cache 111. Application 134 implements an embodiment described herein. For example, in some cases, application 134 can operate in the manner of application 113 to create cache 136. Application 134 can also receive a manifest of cache 111, a data item from cache 111, or both, as a part of a sync operation with application 113, such as over a Bluetooth network with client 112 separate from network 102. Using the manifest or data items, application 134 populates cache 136 at device 132.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), Linux® (Linux is a trademark of Linus Torvalds in the United States and other countries), iOS™ (iOS is a trademark of Cisco Systems, Inc. licensed to Apple Inc. in the United States and in other countries), or Android™ (Android is a trademark of Google Inc., in the United States and in other countries). An object oriented programming system, such as the Java™ programming system, may run in conjunction with the operating system and provide calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as application 113 and application 134 in FIG. 1, are located on storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a mobile computing device, which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Figure 3:
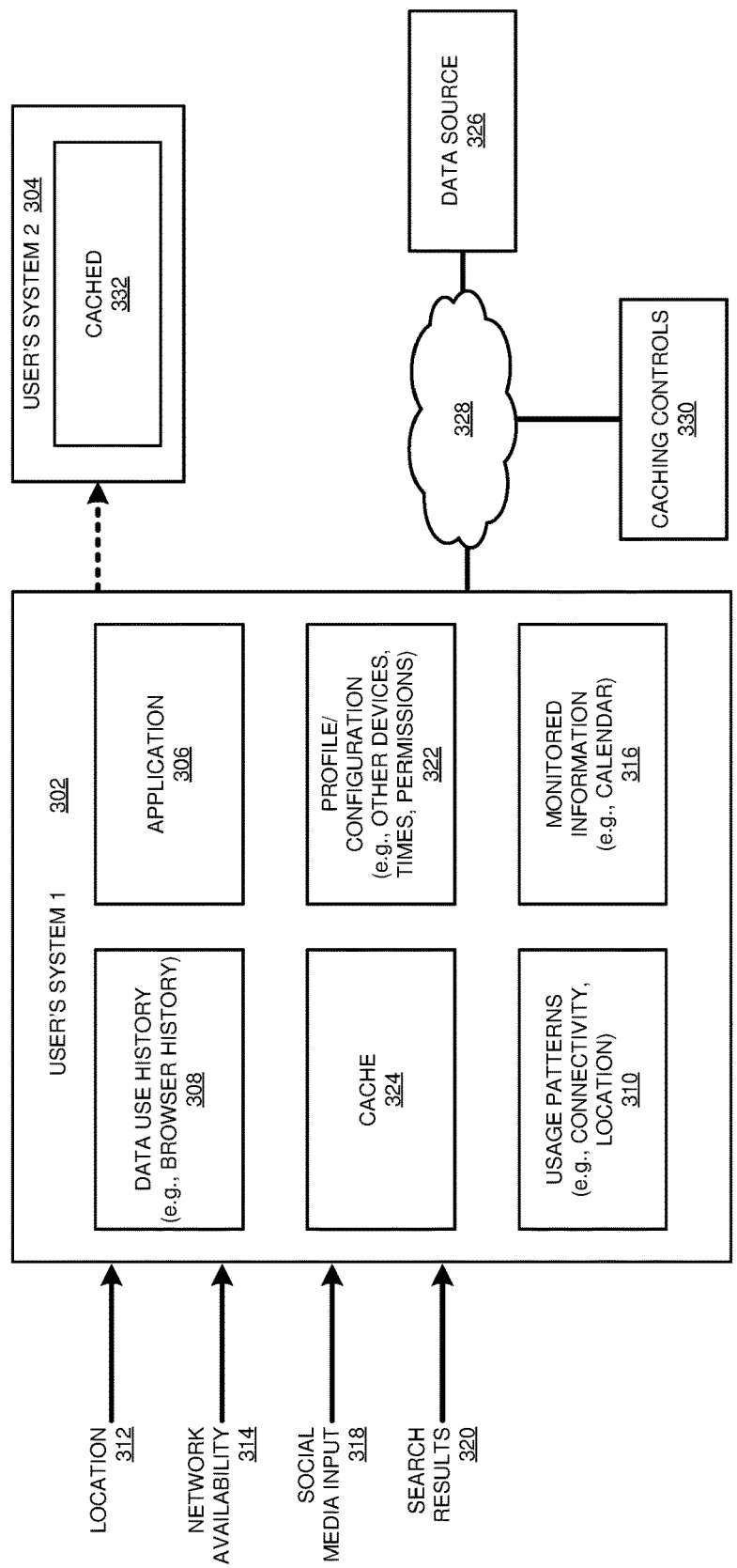
FIG. 3 depicts a block diagram of an example configuration in which remote data can be cached and synchronized in accordance with an illustrative embodiment.

With reference to FIG. 3, this figure depicts a block diagram of an example configuration in which remote data can be cached and synchronized in accordance with an illustrative embodiment. Data processing system 302, labeled "user's system 1" is an example of client 112 in FIG. 1. Data processing system 304, labeled "user's system 2" is an example of device 132 in FIG. 1. Generally, systems 302 and 304 can each be any data processing system or device capable of executing an implementation of an embodiment. For example, system 302 can be an example of device 132, with system 304 being an example of client 112.

Application 306 is an example of application 113 or application 134 in FIG. 1. All or a part of data use history 308 can be stored in and obtained from a remote data processing system, such as data use history 109B in storage 108 in FIG. 1. All or a part of data use history 308 can be stored in and obtained from a local data storage in system 302, such as using a browser's history stored in memory or on a mass storage device of system 302.

Similarly, all or a part of usage patterns 310 can be stored in and obtained from a remote data processing system, such as usage patterns 109A in storage 108 in FIG. 1. All or a part of usage patterns 310 can be stored in, obtained from, or constructed at system 302, such as by using location information 312, network availability information 314 as provided by various modules of system 302.

Similarly, all or a part of monitored information 316 can be stored in and obtained from a remote data processing system, such as from monitored information source 105 in FIG. 1. For example, a calendar server on a corporate LAN can act as monitored information source 105 and provide the calendar appointments for the user of system 302. Social media input 318 and search results 320 are some other forms in which monitored information 320 can be collected. All or a part of red information 316 can be stored in, obtained from, or constructed at system 302, such as by using a local calendaring application executing at system 302.

The user of system 302 configures profile or configuration information 322. In profile 322, the user can configure information such as the devices that the user uses, access privileges of the user and the various devices, networking capabilities of the various devices, any caching preferences, any synchronizing preferences, user identification, permitted or prohibited operations on the various devices, and the like. Application 306 uses these types of configuration information to determine which device to select for caching, whether to cache certain data items at particular devices, how to obtain the data items for caching at the various devices, how to keep, delete, or otherwise manage the cached data items at various devices, and other operations described elsewhere in this disclosure. These examples of configuration information are not intended to be limiting. From this disclosure, those of ordinary skill in the art will be able to conceive many other similarly purposed configuration information and the same are contemplated within the scope of the illustrative embodiments.

Using one or more entries in data use history 308, one or more usage patterns 310, location input 312, network availability information 314, monitored information 316, other information inputs 318 and 320, or a combination thereof, application 306 caches one or data items in cache 324. Data source 326 provides a data item over network 328 for storing in cache 324, subject to one or more caching controls 330. Caching controls 330 can be configured (not shown) in system 302, or may be available to application 306 over network 328 as depicted.

In some cases, system 302 and 304 may also be connected (not shown) to each other via network 328. In other cases, system 302 communicates with system 304 over a private network, such as a Bluetooth connection. Regardless of how system 302 connects with system 304, as long as a data communication path exists between systems 302 and 304, system 302 synchronizes all or a part of cache 324 with system 304 according to a caching control 330. In some cases, system 302 transmits all or some data items in cache 324 for storing in cache 332 according to a caching control 330. System 304 obtains the data items of the manifest from data source 326 and caches the data items in cache 332. In other cases, system 302 transmits a manifest of all or some data items in cache 324 according to a caching control 330. In some other cases, system 302 transmits a manifest of some data items in cache 324 and some data items in cache 324 to system 304 for storing in cache 332 according to a caching control 330.

Figure 4:
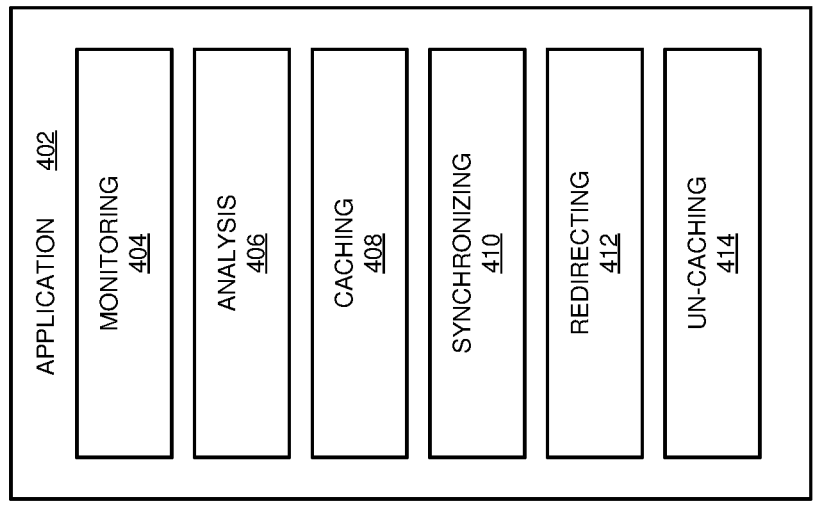
FIG. 4 depicts a block diagram of an example configuration for smart cache for offline data availability in accordance with an illustrative embodiment.

With reference to FIG. 4, this figure depicts a block diagram of an example configuration for smart cache for offline data availability in accordance with an illustrative embodiment. Application 402 is an example of application 306 in FIG. 3.

Component 404 monitors and collects a user's usage patterns, data use history, and other monitored information. Component 406 analyses the collected user's usage patterns, data use history, and other monitored information to determine when a user might be offline and request access to remote data items, what remote data items are likely to be requested, and on which device such a request is likely to be made.

Component 408 accesses the remote data sources that can provide those data items and obtains some or all of those data items in conformity with one or more caching controls. Component 410 determines whether the cached data items are on the device or data processing system from which they are likely to be requested during the future offline period. If one or more data items are not on the device or data processing system from which they are likely to be requested, component 410 synchronizes the cached data item from the data processing system where application 402 is executing to such other device or data processing system.

When the data processing system on which application 402 is executing loses network connectivity and a request for a remote data item is detected at application 402, component 412 redirects the request to the cached data item. Component 412 presents the cached data item instead of the remote data item, which is unreachable due to loss of network connectivity, in response to the request.

Component 414 determines when a data item in the cache has to be un-cached. If a data item has to be un-cached due to a condition specified in a caching control, component 414 un-caches that data item.

Figure 5:
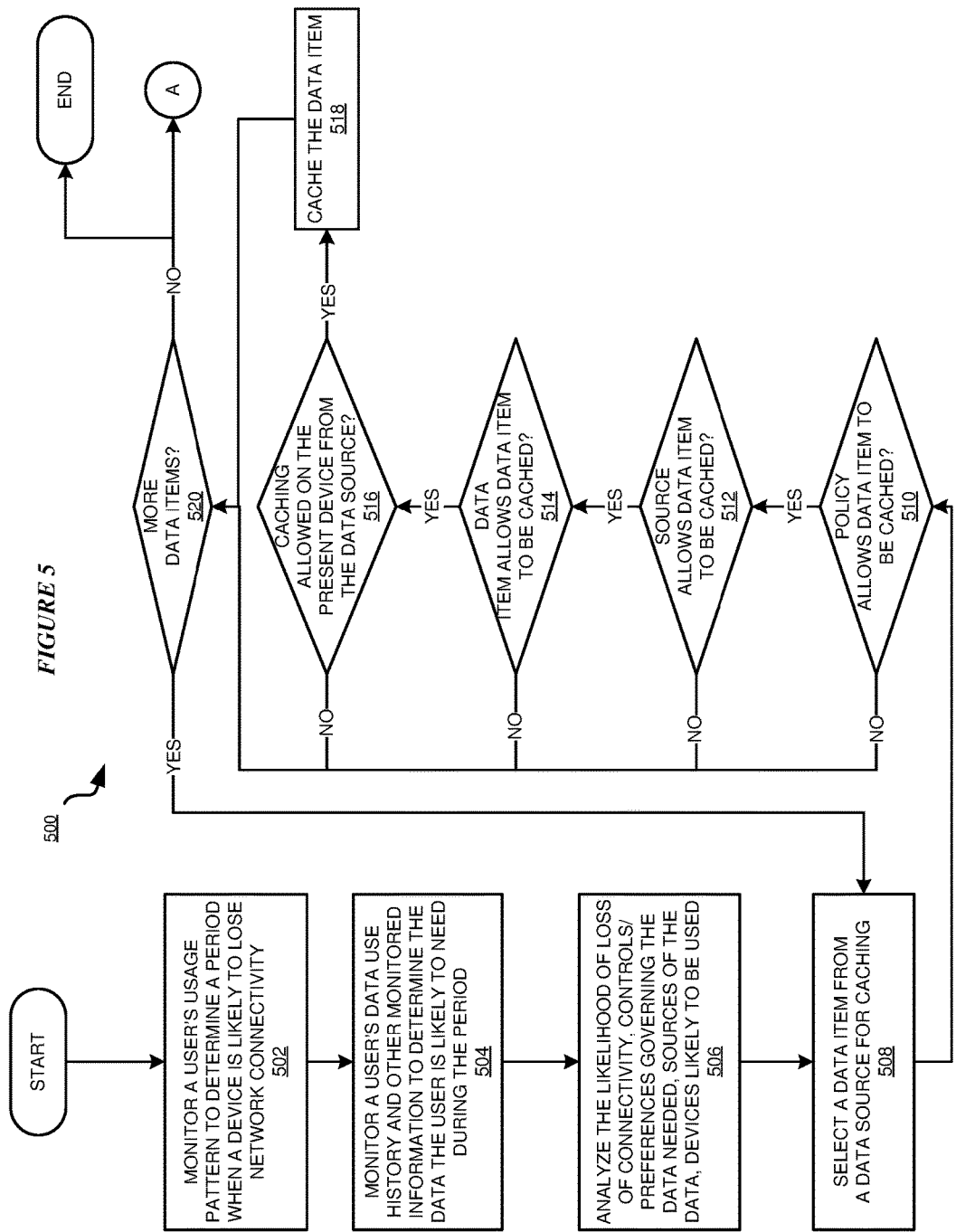
FIG. 5 depicts a flowchart of an example process for smart cache for offline data availability in accordance with an illustrative embodiment.

With reference to FIG. 5, this figure depicts a flowchart of an example process for smart cache for offline data availability in accordance with an illustrative embodiment. Process 500 can be implemented in application 402 in FIG. 4.

The application monitors a user's usage patterns to determine a future period when a device or data processing system used by the user is likely to lose network connectivity (block 502). The application monitors a user's data use history, other monitored information, or a combination thereof, to determine the remote data items that the user is likely to request when the user loses connectivity during the future period (block 504).

The application analyzes the likelihood of the loss of connectivity, caching controls or preferences governing caching of the data items that are likely o be requested during the loss of connectivity, devices or data processing systems that are likely to be used to make those request, and the remote sources that provide those remote data items (block 506). From the data items that are likely to be requested offline, the application selects a data item from a remote data source (block 508).

The application determines whether a caching control, such as a corporate security policy or a user preference, allows the selected data item to be cached (block 510). If the policy allows the data item to be cached ("Yes" path of block 510), the application determines whether the data source allows the data item to be cached (block 512). If the policy does not allows the data item to be cached ("No" path of block 510), the application proceeds to block 520.

If the data source allows the data item to be cached ("Yes" path of block 512), the application determines whether the data item allows the data item to be cached (block 514). If the data source does not allow the data item to be cached ("No" path of block 512), the application proceeds to block 520.

If the data item allows the data item to be cached ("Yes" path of block 514), the application determines whether caching is allowed from the selected data source on the device or data processing system where process 500 is executing (block 516). If the data item does not allow the data item to be cached ("No" path of block 514), the application proceeds to block 520.

If the caching is allowed from the selected data source on the device or data processing system ("Yes" path of block 516), the application caches the data item (block 518). If caching is not allowed from the selected data source on the device or data processing system ("No" path of block 516), the application proceeds to block 520.

The application determines whether more data items that are likely to be requested offline remain to be cached (block 520). If more data items remain ("Yes" path of block 520), the application returns process 500 to block 508 to select another data item. If no more data items remain ("No" path of block 520), the application either ends process 500 thereafter, or exits at exit point marked "A" to enter process 600 in FIG. 6 at entry point marked "A".

Figure 6:
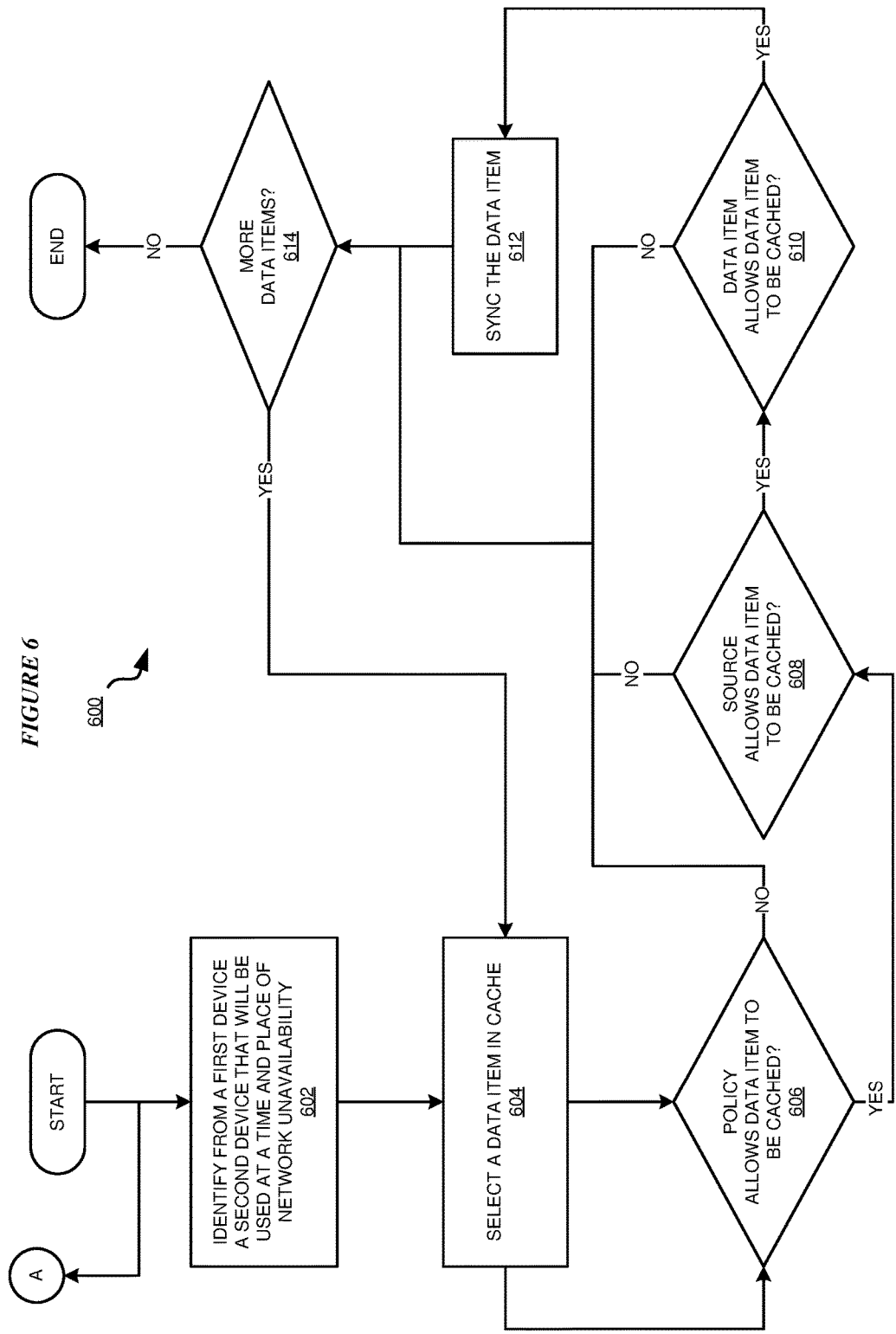
FIG. 6 depicts a flowchart of an example process for synchronizing a smart cache for offline data availability in accordance with an illustrative embodiment.

With reference to FIG. 6, this figure depicts a flowchart of an example process for synchronizing a smart cache for offline data availability in accordance with an illustrative embodiment. Process 600 can be implemented in application 402 in FIG. 4.

The application identifies, from a first device or data processing system where process 600 is executing, a second device or data processing system, where the second device or data processing system is likely to be used at a future time and place when network connectivity will be unavailable (block 602). The determination of block 602 is based on the operations of monitoring component 404 and analysis component 406 as described in FIG. 4. From the data items that are cached at the first device or data processing system, the application selects a data item (block 604).

The application determines whether a caching control, such as a corporate security policy or a user preference, allows the selected data item to be cached at the second device or data processing system (block 606). If the policy allows the data item to be cached ("Yes" path of block 606), the application determines whether the data source allows the data item to be cached at the second device or data processing system (block 608). If the policy does not allows the data item to be cached ("No" path of block 606), the application proceeds to block 614.

If the data source allows the data item to be cached ("Yes" path of block 608), the application determines whether the data item allows the data item to be cached at the second device or data processing system (block 610). If the data source does not allow the data item to be cached ("No" path of block 608), the application proceeds to block 614.

If the data item allows the data item to be cached ("Yes" path of block 610), the application synchronizes, or schedules for synchronization, the data item to a cache in the second device or data processing system (block 612). If the data item does not allow the data item to be cached ("No" path of block 610), the application proceeds to block 614.

The application determines whether more data items that are likely to be requested offline remain to be cached (block 614). If more data items remain ("Yes" path of block 614), the application returns process 600 to block 604 to select another data item. If no more data items remain ("No" path of block 614), the application ends process 600 thereafter.

Figure 7:
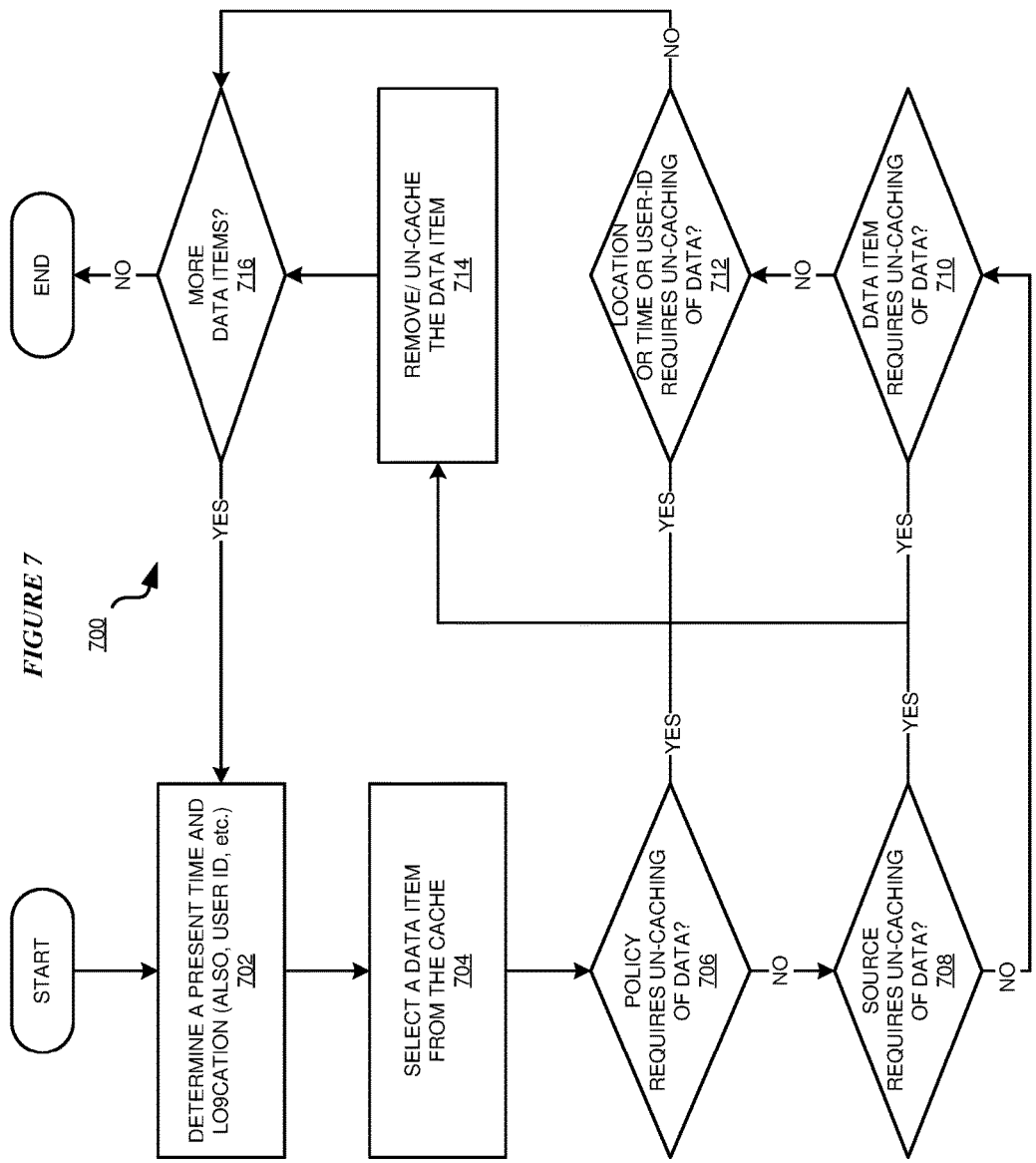
FIG. 7 depicts a flowchart of an example process for un-caching data items from a smart cache in accordance with an illustrative embodiment.

With reference to FIG. 7, this figure depicts a flowchart of an example process for un-caching data items from a smart cache in accordance with an illustrative embodiment. Process 500 can be implemented in application 402 in FIG. 4.

The application determines a present time and location of the device or data processing system where one or more data items are cached (block 702). From the data items that are in the cache, the application selects a data item (block 704).

The application determines whether a caching control, such as a corporate security policy or a user preference, requires the un-caching of the selected data item (block 706). If the policy does not require the un-caching ("No" path of block 706), the application determines whether the data source requires the un-caching of the selected data item (block 708). If the policy requires the un-caching of the selected data item ("Yes" path of block 706), the application proceeds to block 714.

If the data source does not require the un-caching of the selected data item ("No" path of block 708), the application determines whether the data item requires the un-caching of the selected data item (block 710). If the data source requires the un-caching of the selected data item ("Yes" path of block 708), the application proceeds to block 714.

If the data item does not require the un-caching of the selected data item ("No" path of block 710), the application determines whether a location, time, a user identifier, or some combination thereof, requires the un-caching of the selected data item (block 712). If the location, time, a user identifier, or some combination thereof, requires the un-caching of the selected data item ("Yes" path of block 712), the application un-caches the data item (block 714).

The application determines whether more data items that are remain in the cache that have to be evaluated for un-caching in a similar manner (block 716). If more data items remain ("Yes" path of block 716), the application returns process 700 to block 702 to select another data item. If no more data items remain ("No" path of block 716), the application ends process 500 thereafter.

Some example decision blocks, such as block 510-516 in FIG. 5, blocks 606-610 in FIG. 6, and blocks 706-712 in FIG. 7, are described only as example and not as limitation on the illustrative embodiments. From this disclosure, those of ordinary skill in the art will be able to adapt process 500, 600, and 700 to use additional or different determinations, in different combinations, in different orders, in a similar manner and for similar purposes. Such adaptations are contemplated within the scope of the illustrative embodiments.

Thus, a computer implemented method, system or apparatus, and computer program product are provided in the illustrative embodiments for smart cache for offline data availability. Where an embodiment or a portion thereof is described with respect to a type of device, the computer implemented method, system or apparatus, the computer program product, or a portion thereof, are adapted or configured for use with a suitable and comparable manifestation of that type of device.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for automatically caching remote data for offline availability, the method comprising:
   analyzing, at an application executing in a first data processing system, a usage pattern of the first data processing system and an entry in a data use history of the first data processing system;
   anticipating, responsive to the analyzing, a data item for caching at the first data processing system, wherein the data item is accessible to the first data processing system from at a remote data processing system over a data network at a present time, wherein the data item is not scheduled to be used at the present time, and the anticipating comprises a second anticipating that the data item will be requested from the first data processing system at a future time when no network connectivity will be available to the first data processing system;
   modifying a caching component to cause additional caching, wherein the caching component natively only caches user-specified data on user-specified devices, wherein the additional caching caches the data item on the first data processing system;
   constructing a manifest at the first data processing system, wherein the manifest includes an identifier of the data item;
   caching a second data item at the first data processing system;
   determining, at the application, that a first caching control prevents the caching of the second data item at a second data processing system; and
   omitting, responsive to the first caching control preventing the caching of the second data item at the second data processing system, information usable to cache the second data item from the manifest.

2. The method of claim 1, further comprising:
   determining, responsive to the analyzing a second usage pattern, that the data item will be requested from the second data processing system at the future time when no network connectivity will be available to the second data processing system;
   determining whether a second caching control prevents the caching of the data item at the second data processing system; and
   supplying, responsive to the second caching control not preventing the caching of the data item at the second data processing system, information usable to cache the data item on the second data processing system.

3. The method of claim 2, further comprising:
   determining that the second data processing system has access to the remote data processing system at the present time; and
   sending, as a part of the supplying, the manifest to the second data processing system, wherein the second data processing system uses the identifier in the manifest to obtain the data item from the remote data processing system.

4. The method of claim 3, further comprising:
   caching, at the first data processing system, a second data item from a second remote data processing system;
   determining that the second data processing system has access to the second remote data processing system at the present time; and
   sending, as a part of the supplying, the manifest and the second data item to the second data processing system.

5. The method of claim 2, further comprising:
   determining that the second data processing system does not have access to the remote data processing system at the present time; and
   sending, as a part of the supplying, the data item to the second data processing system.

6. The method of claim 1, further comprising:
   determining whether a caching control prevents the caching of the data item at the first data processing system, wherein the additional caching is responsive to the caching control not preventing the caching of the data item, and wherein the caching control comprises a policy that determines whether a particular data item can be cached, and wherein the policy is specified by a system in the data network.

7. The method of claim 1, further comprising:
   determining whether a caching control prevents the caching of the data item at the first data processing system, wherein the additional caching is responsive to the caching control not preventing the caching of the data item, and wherein the caching control comprises a policy that determines whether a particular data item can be cached, and wherein the policy is specified by a source of the particular data item.

8. The method of claim 1, further comprising:
   determining whether a caching control prevents the caching of the data item at the first data processing system, wherein the additional caching is responsive to the caching control not preventing the caching of the data item, and wherein the caching control comprises a policy that determines whether a particular data item can be cached, and wherein the policy is specified by the particular data item.

9. The method of claim 1, further comprising:
determining whether a caching control prevents the caching of the data item at the first data processing system, wherein the additional caching is responsive to the caching control not preventing the caching of the data item, and wherein the caching control comprises a policy that determines whether a particular data item can be cached on the first data processing system, and wherein the policy is specified by one of (i) a system in the data network, and (ii) the first data processing system.

10. The method of claim 1, wherein the data item is unrelated to an activity being performed at the first data processing system at the present time, and wherein the data item is not specified by a user of the first data processing system.

11. The method of claim 1, wherein the usage pattern comprises:
information describing a period, a location, and an indicator of network availability at the first data processing system at the location during the period.

12. The method of claim 1, further comprising:
constructing the usage pattern using a calendar entry from a calendar application.

13. The method of claim 1, further comprising:
constructing the usage pattern using network availability information from a social media application.

14. The method of claim 1, further comprising:
constructing the usage pattern using network availability information from a search engine.

15. The method of claim 1, wherein the entry in the data use pattern comprises information identifying a type of data accessed by the first data processing system corresponding to the usage pattern, wherein the data item is of the type of data.

16. The method of claim 1, wherein the method is embodied in a computer program product comprising one or more computer-readable storage devices and computer-readable program instructions which are stored on the one or more computer-readable tangible storage devices and executed by one or more processors.

17. The method of claim 1, wherein the method is embodied in a computer system comprising one or more processors, one or more computer-readable memories, one or more computer-readable storage devices and program instructions which are stored on the one or more computer-readable storage devices for execution by the one or more processors via the one or more memories and executed by the one or more processors.

18. A computer program product for automatically caching remote data for offline availability, the computer program product comprising a computer-readable storage device and program instructions stored on the computer-readable storage device, the stored program instructions comprising:
computer usable code to analyze, at an application executing in a first data processing system, a usage pattern of the first data processing system and an entry in a data use history of the first data processing system;
computer usable code to anticipate, responsive to the computer usable code to analyze, a data item for caching at the first data processing system, wherein the data item is accessible to the first data processing system from at a remote data processing system over a data network at a present time, wherein the data item is not scheduled to be used at the present time, and the computer usable code to anticipate comprises computer usable code to perform a second anticipating that the data item will be requested from the first data processing system at a future time when no network connectivity will be available to the first data processing system;
computer usable code to modify a caching component to cause additional caching, wherein the caching component natively only caches user-specified data on user-specified devices, wherein the additional caching caches the data item on the first data processing system;
computer usable code to construct a manifest at the first data processing system, wherein the manifest includes an identifier of the data item;
computer usable code to cache a second data item at the first data processing system;
computer usable code to determine, at the application, that a first caching control prevents the caching of the second data item at a second data processing system; and
computer usable code to omit, responsive to the first caching control preventing the caching of the second data item at the second data processing system, information usable to cache the second data item from the manifest.

19. A computer system for automatically caching remote data for offline availability, the computer system comprising:
one or more processors, one or more computer-readable memories and one or more computer-readable storage devices;
program instructions stored on at least one of the one or more storage devices for execution by at least one of the one or more processors via at least one of the one or more memories, the stored program instructions comprising:
computer usable code to analyze, at an application executing in a first data processing system, a usage pattern of the first data processing system and an entry in a data use history of the first data processing system;
computer usable code to anticipate, responsive to the computer usable code to analyze, a data item for caching at the first data processing system, wherein the data item is accessible to the first data processing system from at a remote data processing system over a data network at a present time, wherein the data item is not scheduled to be used at the present time, and the computer usable code to anticipate comprises computer usable code to perform a second anticipating that the data item will be requested from the first data processing system at a future time when no network connectivity will be available to the first data processing system;
computer usable code to modify a caching component to cause additional caching, wherein the caching component natively only caches user-specified data on user-specified devices, wherein the additional caching caches the data item on the first data processing system;
computer usable code to construct a manifest at the first data processing system, wherein the manifest includes an identifier of the data item;

computer usable code to cache a second data item at the first data processing system;

computer usable code to determine, at the application, that a first caching control prevents the caching of the second data item at a second data processing system; and computer usable code to omit, responsive to the first caching control preventing the caching of the second data item at the second data processing system, information usable to cache the second data item from the manifest.

\* \* \* \* \*